US012628835B2

(12) United States Patent
Chappell

(10) Patent No.: US 12,628,835 B2
(45) Date of Patent: May 19, 2026

(54) LOIN PULLER CONVEYOR

(71) Applicant: Hall Fabrication, Inc., Henderson, NV (US)

(72) Inventor: David Chappell, Las Vegas, NV (US)

(73) Assignee: Hall Fabrication, Inc., Henderson, NV (US)

( * ) Notice: Subject to any disclaimer, the term of this patent is extended or adjusted under 35 U.S.C. 154(b) by 32 days.

(21) Appl. No.: 18/416,090

(22) Filed: Jan. 18, 2024

(65) Prior Publication Data

US 2025/0234871 A1      Jul. 24, 2025

(51) Int. Cl.
| *A22B 5/00* | (2006.01) |
| *A22C 17/00* | (2006.01) |
| *A22C 17/02* | (2006.01) |
| *B65G 17/06* | (2006.01) |

(52) U.S. Cl.
CPC ........ *A22B 5/0094* (2013.01); *A22C 17/0033* (2013.01); *A22C 17/0093* (2013.01); *A22C 17/02* (2013.01); *B65G 17/067* (2013.01); *B65G 2201/0202* (2013.01)

(58) Field of Classification Search
CPC .............. A22B 5/0094; A22C 17/0033; A22C 17/0093; A22C 17/02; B65G 2201/0202; B65G 17/067
USPC ........................................................ 452/171
See application file for complete search history.

(56) References Cited

U.S. PATENT DOCUMENTS

| 5,287,957 | A | * | 2/1994 | Iuchi ....................... B65B 43/54 |
| | | | | 198/803.14 |
| 6,089,968 | A | | 7/2000 | Andre et al. |
| 6,547,658 | B2 | | 4/2003 | Boody et al. |
| 7,118,471 | B2 | | 10/2006 | Chappell et al. |
| 7,226,350 | B1 | | 6/2007 | Chappell |
| 7,354,339 | B2 | | 4/2008 | Chappell et al. |
| 7,467,996 | B1 | * | 12/2008 | Jager .................. A22C 17/0093 |
| | | | | 452/177 |
| 9,138,781 | B1 | * | 9/2015 | Strong .................... B26F 3/004 |
| 9,147,755 | B1 | * | 9/2015 | Han ...................... H10D 48/383 |
| 2002/0019208 | A1 | * | 2/2002 | Boody ............... A22C 17/0046 |
| | | | | 452/171 |
| 2004/0038637 | A1 | * | 2/2004 | van den Dungen ........................ |
| | | | | A22C 17/0093 |
| | | | | 452/51 |
| 2012/0108155 | A1 | * | 5/2012 | Bolte ..................... A22C 17/12 |
| | | | | 452/134 |
| 2015/0210476 | A1 | * | 7/2015 | Ramsdell ............. B65G 17/065 |
| | | | | 198/850 |
| 2020/0254641 | A1 | * | 8/2020 | Hocker .................. B25J 9/0093 |
| 2021/0227840 | A1 | * | 7/2021 | Blaine .................... B26D 5/007 |

(Continued)

*Primary Examiner* — Richard T Price, Jr.

(74) *Attorney, Agent, or Firm* — McKee, Voorhees & Sease, PLC

(57) ABSTRACT

A conveyor for a loin puller machine has a plurality of rigid belly slats and chine slats to support the carcass which is carried past knives or blades on the machine for skinning, trimming, and cutting the meat carcass. The belly slats and chine slats are attached to chains extending around a drive roller and an idler roller to form an endless loop. The belly slats have a flat upper surface and the chine slats have a curved upper surface corresponding to the belly portion and chain portion of the carcass. The belly slats and chine slats are spaced apart from one another to define a gap through which the cutting blades of the machine extend.

18 Claims, 12 Drawing Sheets

(56) References Cited

U.S. PATENT DOCUMENTS

| 2022/0132872 A1* | 5/2022 | Blaine | G05B 17/02 |
| | | | 452/157 |
| 2023/0365336 A1* | 11/2023 | Shan | B65G 47/96 |
| 2025/0234871 A1* | 7/2025 | Chappell | A22C 17/02 |

* cited by examiner

LOIN PULLER CONVEYOR

TECHNICAL FIELD

The invention is directed toward a rigid conveyor for a loin pulling machine which does not sag under the weight of the carcass.

BACKGROUND

Conventional loin puller machines in the meat processing industry typically include a belt conveyor for moving a pork carcass past one or more cutting blades for trimming skin and fat from the carcass. Dual blade loin knife assemblies are also used to separate the loin portion from the belly portion of a hog carcass, as well as a belly shelf and fingers of lean meat on the belly of the hog using a Z-blade, and a J-blade which cuts from the chine backbone side of the carcass to separate the fatback portion from the loin portion. The belt conveyor of these loin processing machines is normally a two-ply combination of cloth and PVC, with a seamless construction, extending around a drive roller or sprocket and an idler roller or sprocket. A single processing line can operate at a rate of 1350 carcasses per hour. Conveyor belts have a relatively short life, of approximately 2-3 weeks, thus must be replaced relatively frequently. The framework of the loin puller machine has to be removed to pull the seamless belt off the drive and idler rollers, and install a new belt. A typical cost of the new belt is $500. Replacing a belt takes 30-60 minutes, which is significant downtime that carcasses cannot be processed, leading to the loss of thousands of dollars to the operator.

Also, belt conveyors tend to sag under the weight of the carcass. This sagging condition of the belt conveyor causes less accurate cutting of the carcass by the loin puller blades, with too much or too little material being removed from the carcass. Such inaccurate cutting leads to reduced yield, and/or the need for additional trimming of the carcass, thus adding more cost to the process. Thus, conveyor belt sag causes lost profits for the operator.

Therefore, a primary objective of the present invention is the provision of an improved conveyor system for a meat processing machine.

A further objective of the present invention is the provision of a loin pulling machine having a rigid conveyor to support carcasses without sagging as the carcass moves through the cutting blades of the machine.

Still another objective of the present invention is the provision of a method for improved processing of the carcasses maximum yield and profitability.

A further objective of the present invention is the provision of a slat conveyor for a loin pulling machine, without sagging under the weight of the carcass.

Another objective of the present invention is a provision of a loin pulling machine having a conveyor comprising a plurality of laterally extending slats that support the belly portion and the chine portion of the carcass.

Yet another objective of the present invention is the provision of a loin processing machine conveyor having a plurality of slats supporting the carcass, wherein individual slats can be replaced if damaged, without removing the remainder of the slats.

Another objective of the present invention is the provision of an endless loop conveyor for a loin puller machine having a first set of stiff belly slats and a second set of stiff chine slats which support the belly and chine portions of the carcass, respectively.

Yet another objective of the present invention is the provision of a loin puller machine having a conveyor with a plurality of transverse slats individually connected to a chain drive assembly of the machine.

These and other objectives will become apparent from the following description of the invention.

SUMMARY

A loin puller machine has a conveyor for carrying pork carcasses for cutting by blades on the machine. The conveyor of the machine includes an endless loop chain assembly mounted on the machine, and a drive system a drive roller and idler roller about which the chain assembly is operatively mounted. A first set of rigid belly slats are mounted to the chain assembly to support a belly portion of the carcass. A second set of rigid chine slats are also mounted on the chain assembly to support a chine portion of the carcass. The first and second sets of slats form an endless loop, with the carcass being supported on the slats without the slats sagging under the weight of the carcass. The belly slats have a flat upper surface, and the chine slats have a curved surface. The belly and chine slats have a bottom surface with a recess or pocket for receiving a portion of the chain assembly system. Bolts or screws secure the each of the slats to the chain assembly.

A method of conveying the pork carcass for cutting on a loin puller machine includes the step of supporting the carcass on top of a plurality of slats connected to the endless loop chain drive assembly of the machine, and driving the chain assembly around the end rollers to move the slats and carcass past the cutting blades on the machine, without the slats deflecting or sagging due to the weight of the carcasses.

DETAILED DESCRIPTION

Figure 1:
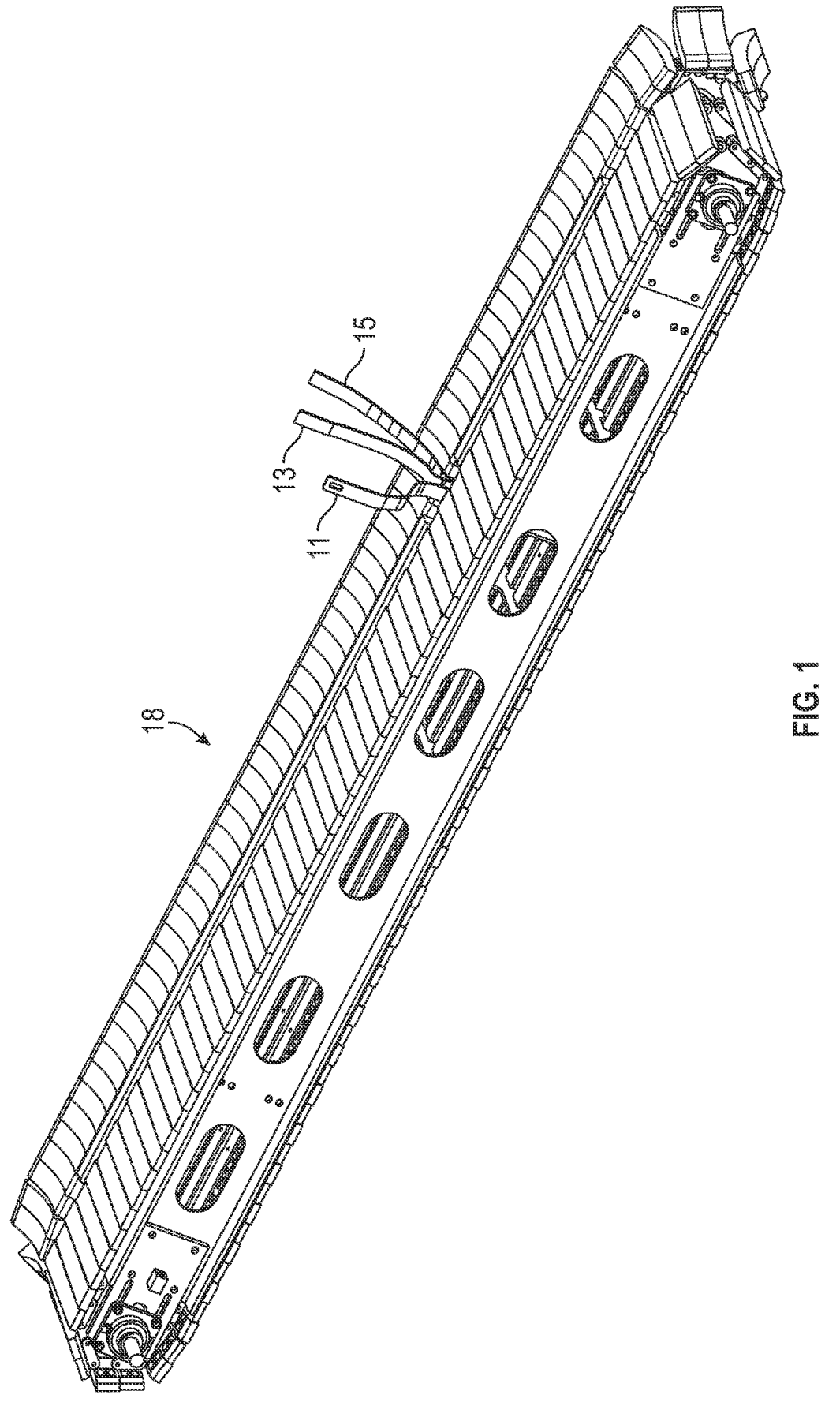
FIG. 1 is a perspective view of the conveyor assembly of the loin pulling machine, according to the present invention, with J, Z, and trim blades mounted thereon.

The conveyor assembly 10 of the present invention is intended for use on a loin puller machine (not shown) to transport a meat carcass, such as a pork carcass, through a plurality of blades, such as Z blade 11, J blade 13, and trim blade 15, shown in FIG. 1, to remove the skin and fat from the carcass and to cut loins and other meat portions for eventual sale. The blades 11, 13, and 15 are shown and described in Applicant's co-pending application Ser. No. 18/416,535 filed contemporaneously herewith. The conveyor assembly 10 includes a frame 12 having opposite ends, with a drive sprocket or roller at one end and an idler sprocket or roller at the opposite end. An electric motor (not shown) is operatively connected to the drive roller 14. A plurality of chains 18 are trained about the rollers 14, 16. Actuation of the motor drives the roller 14, which in turn rotates the roller 16 via the chains 18.

The conveyor assembly 10 has a support surface comprising a plurality of belly slats 20 and a plurality of chine slats 22 attached to at least one of the chains 18. Guide rails 21, 23, 25 on the frame 12 help guide or track the slats during operation of the conveyor 10.

Figure 5:
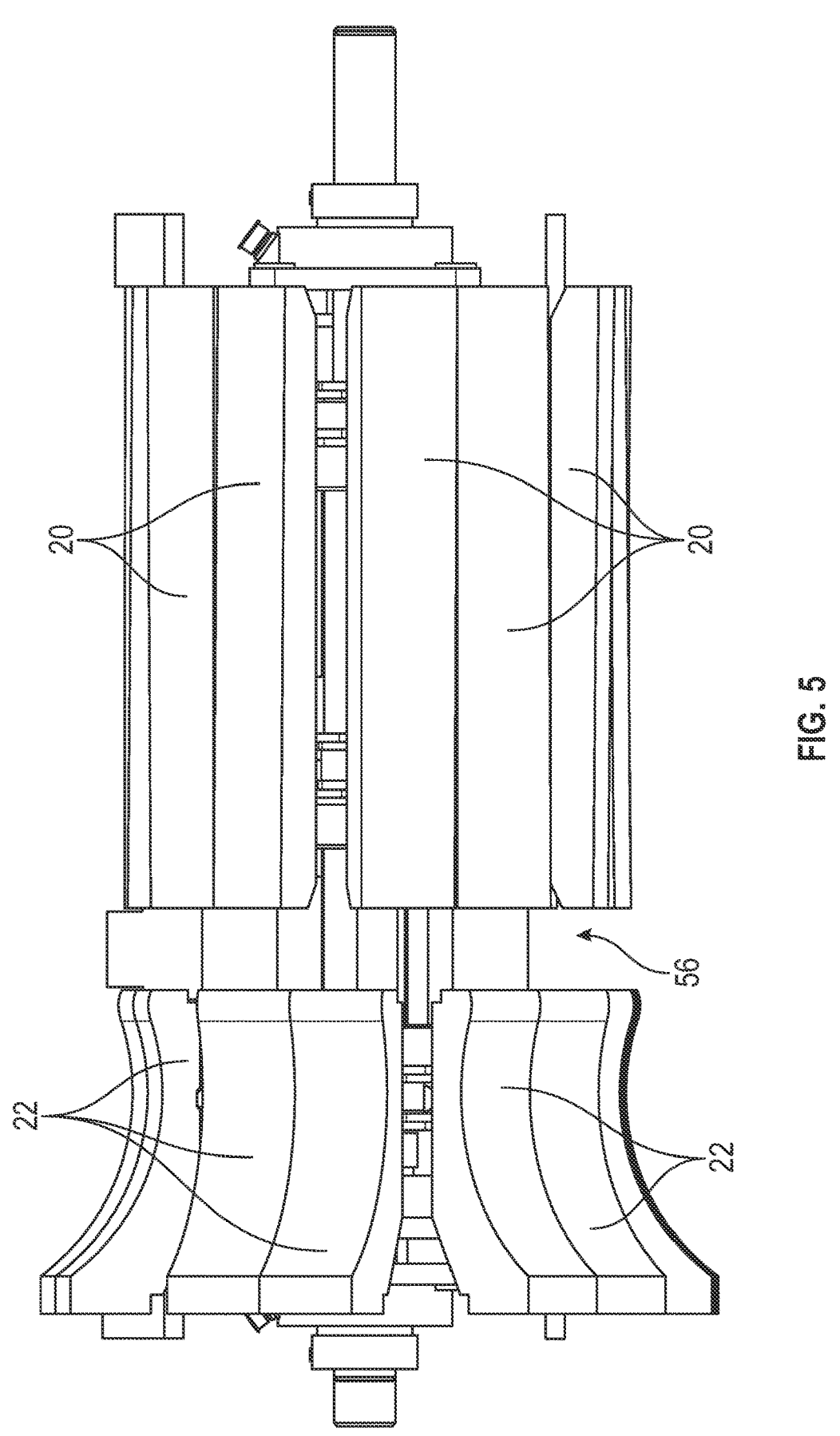
FIG. 5 is a front elevation view of the conveyor assembly shown in FIG. 1.
Figure 6:
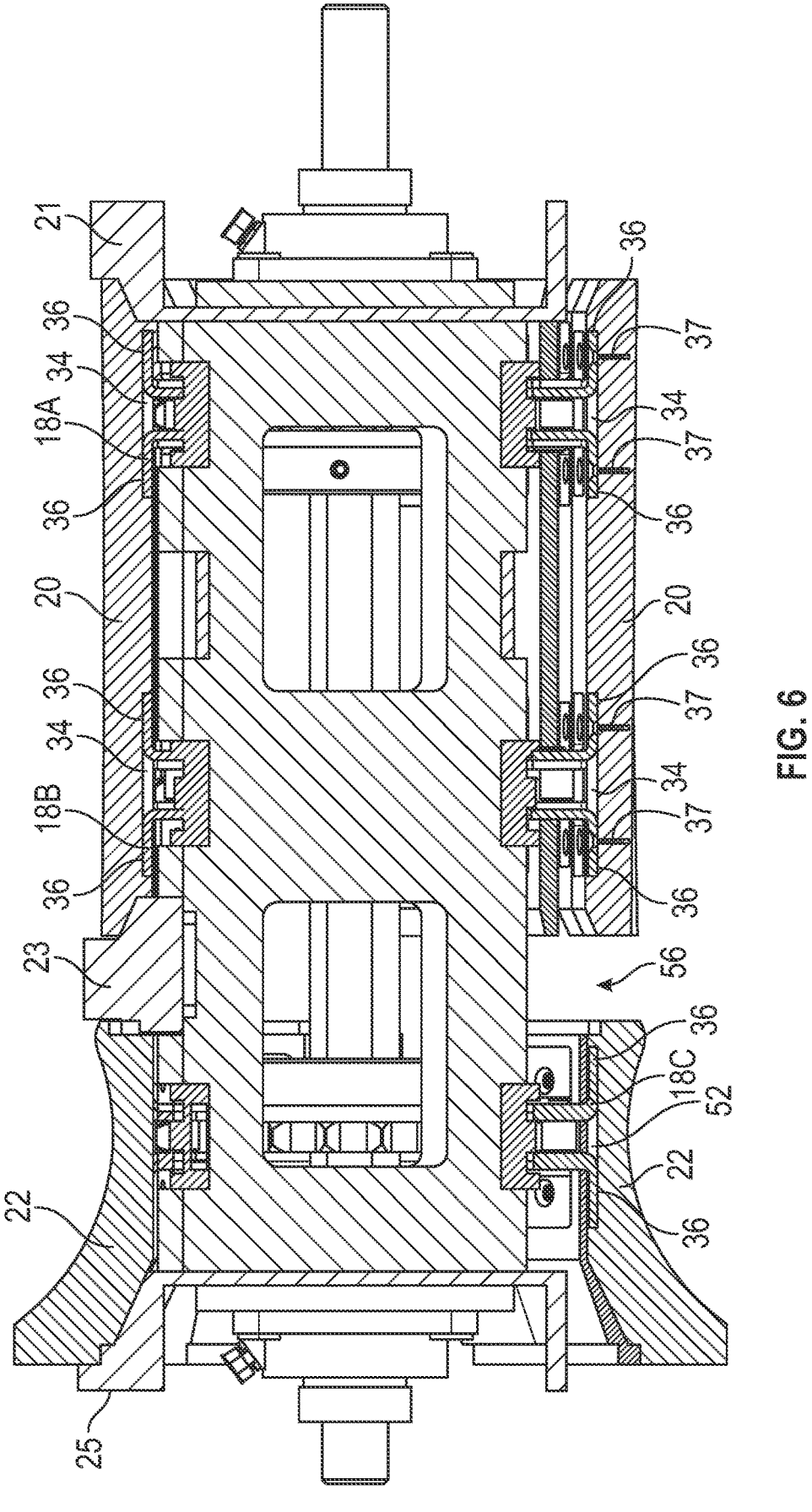
FIG. 6 is a sectional view taken along lines 6-6 of FIG. 1.
Figure 7:
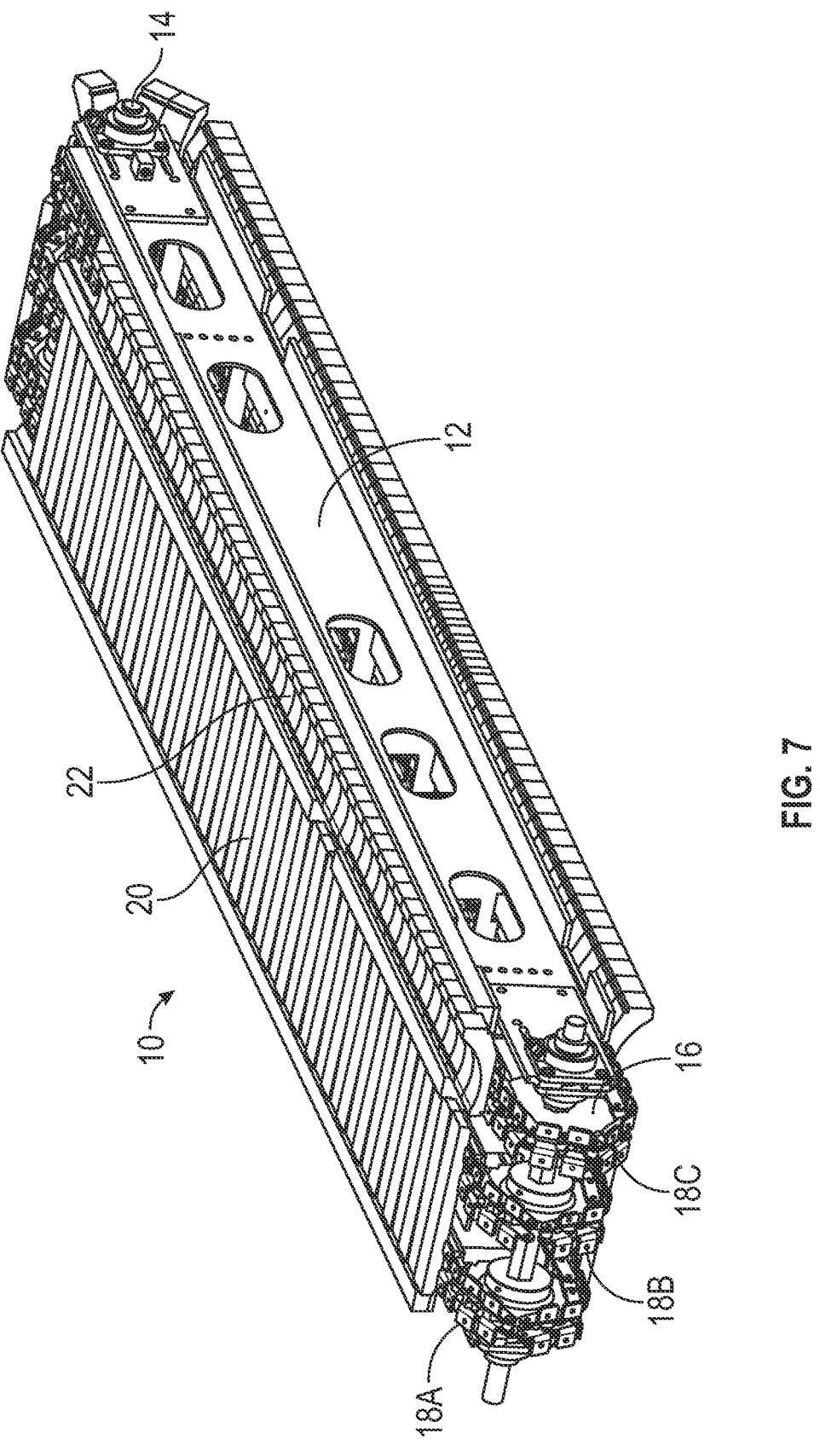
FIG. 7 is another perspective view of the conveyor assembly, with some slats removed to show the chain drive system.
Figure 8:
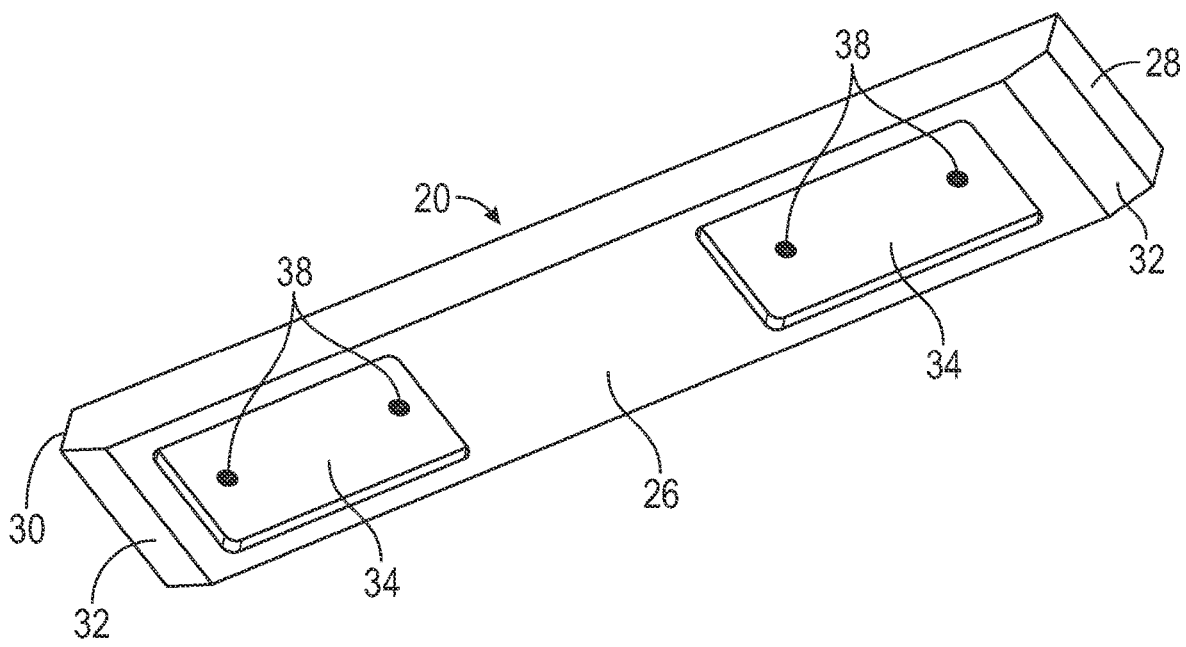
FIG. 8 is a bottom perspective view of one of the belly slats of the conveyor assembly shown in FIG. 1.
Figure 9:
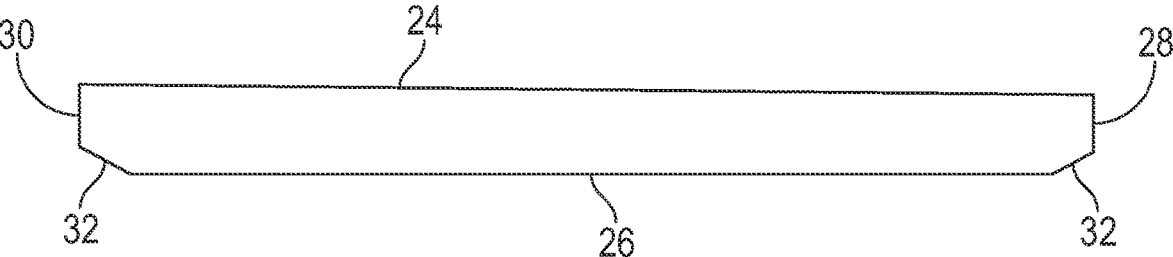
FIG. 9 is a front elevation view of the belly slat shown in FIG. 8.
Figure 10:
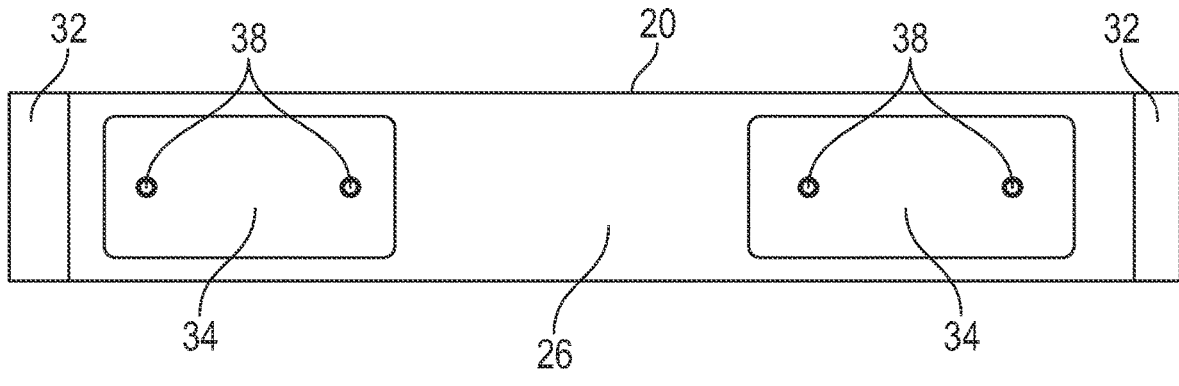
FIG. 10 is a bottom plan view of the belly slat shown in FIG. 8.
Figure 11:
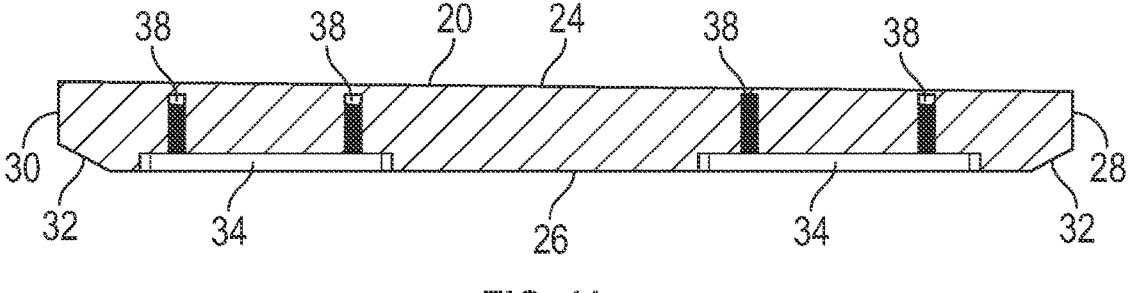
FIG. 11 is a sectional view taken along lines 11-11 of FIG. 8
Figure 12:
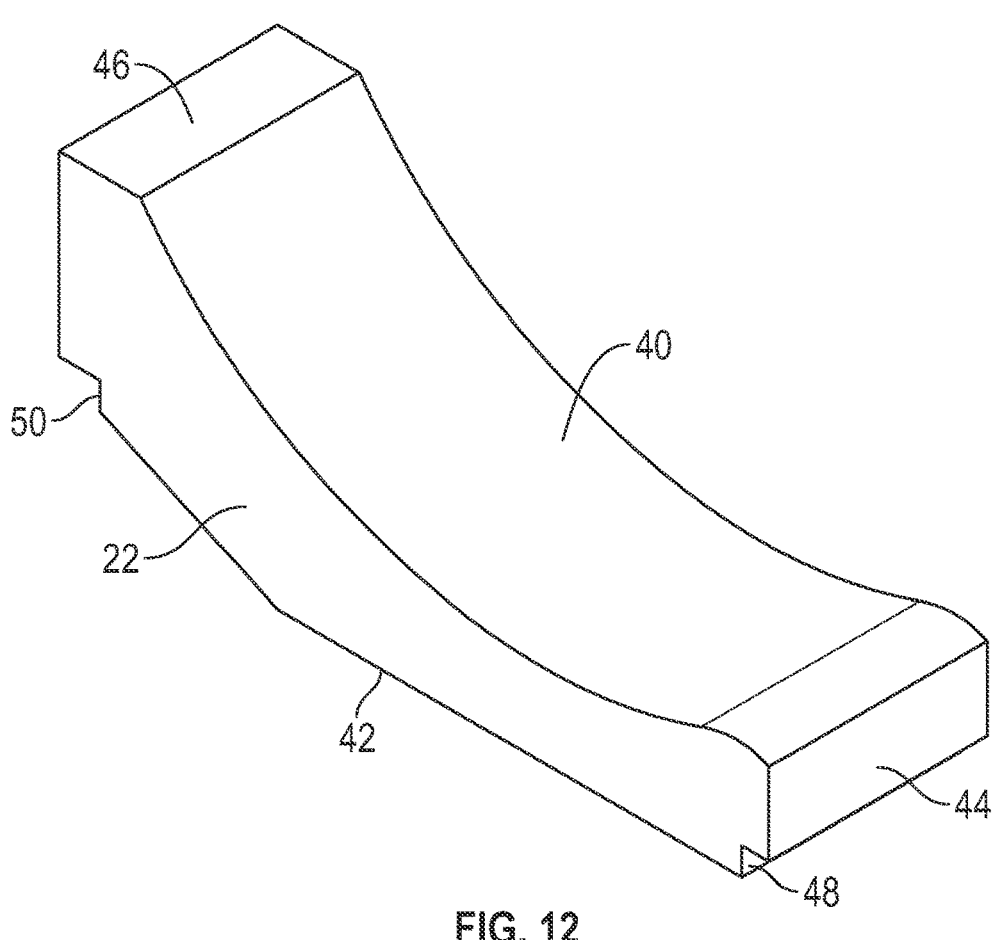
FIG. 12 is a top perspective view of one of the chine slats of the conveyor assembly shown in FIG. 1.

More particularly, each belly slat 20 has a flat, or substantially flat, upper surface 24, a bottom surface 26, and opposite inner and outer ends 28, 30, respectively. The ends 28, 30 may each have a beveled portion 32 as seen in FIGS. 8 and 9, which mate with or are supported by the rails 21, 23, as seen in FIG. 5. The bottom surface 26 of the belly slat 20 includes a pair of recesses or pockets 34, which are sized to receive tabs or flanges 36 on the chains 18A and 18B, as seen in FIG. 6. The belly slats 20 are attached to the chain tabs or flanges 36 with bolts or screws 38 which are received in threaded holes 38 in the recesses 34.

Figure 13:
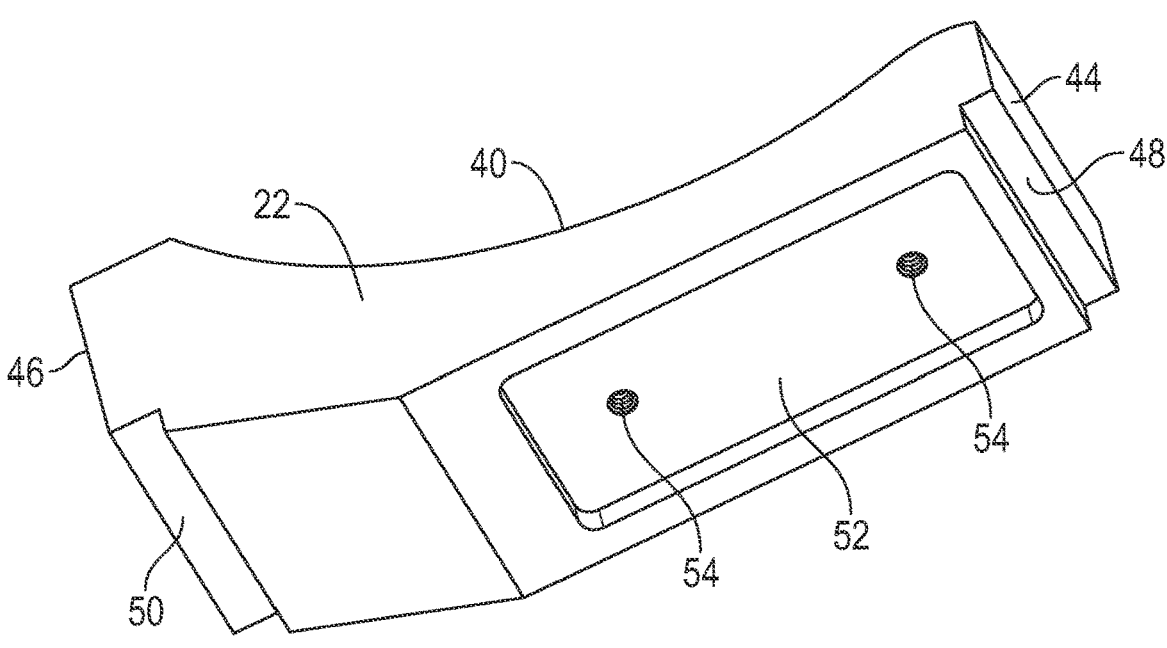
FIG. 13 is a bottom perspective view of the chine slat shown in FIG. 12.
Figure 14:
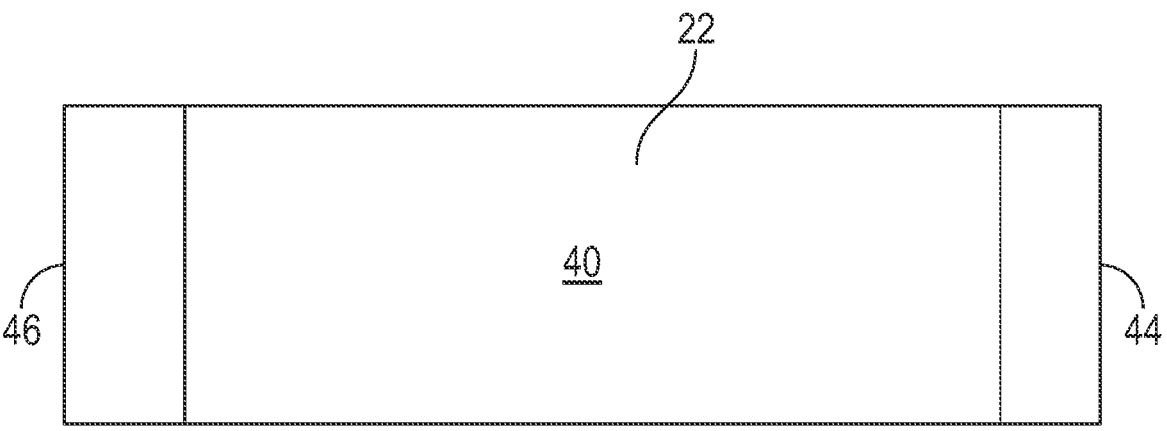
FIG. 14 is a top plan view of the chine slat shown in FIG. 12.
Figure 15:
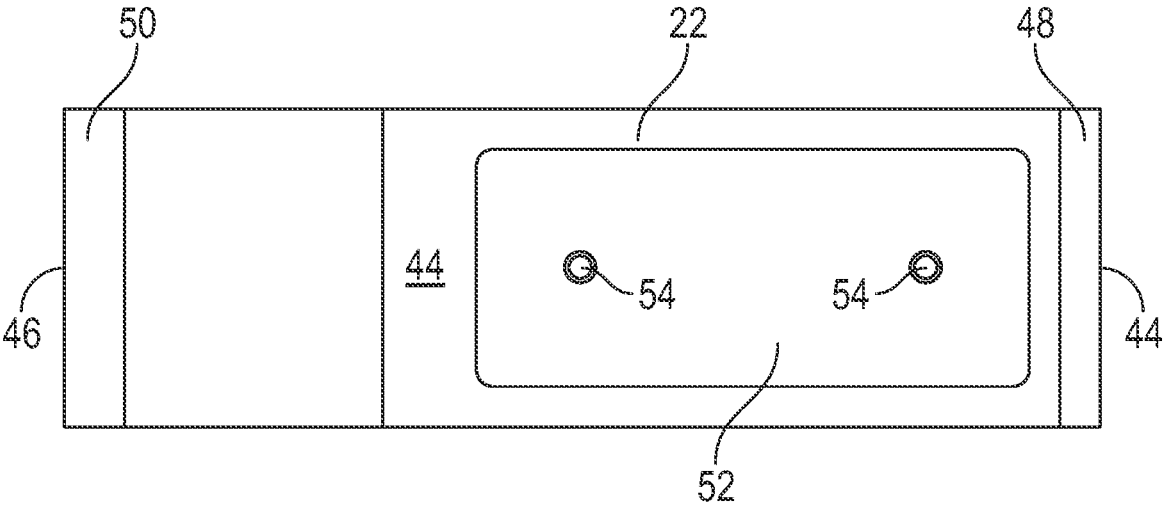
FIG. 15 is a bottom plan view of the chine slack shown in FIG. 12.
Figures 16, 17:
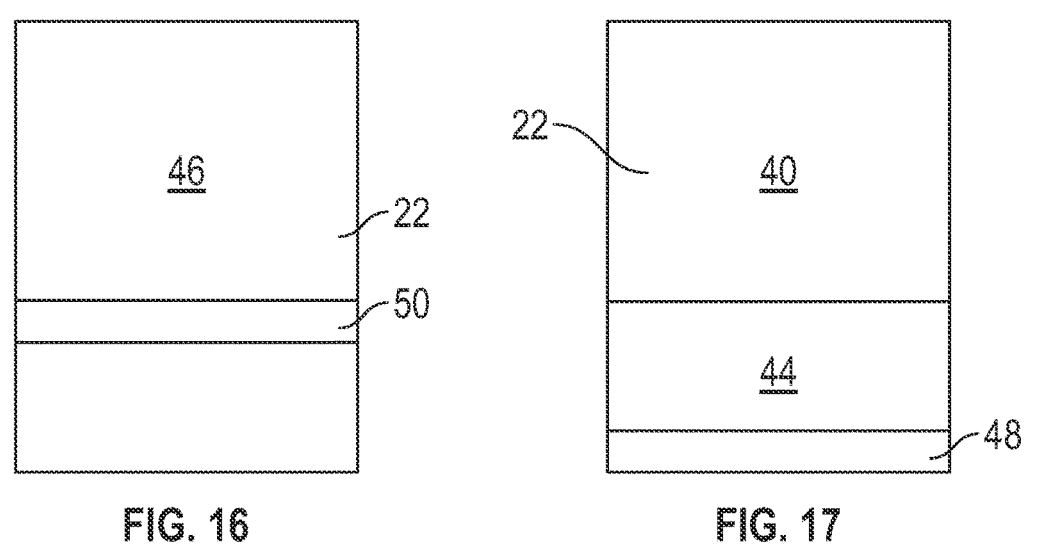
FIG. 16 is a left side elevation view of the chine slack shown in FIG. 12.
FIG. 17 is a right side elevation view of the chine slack shown in FIG. 12.
Figure 18:
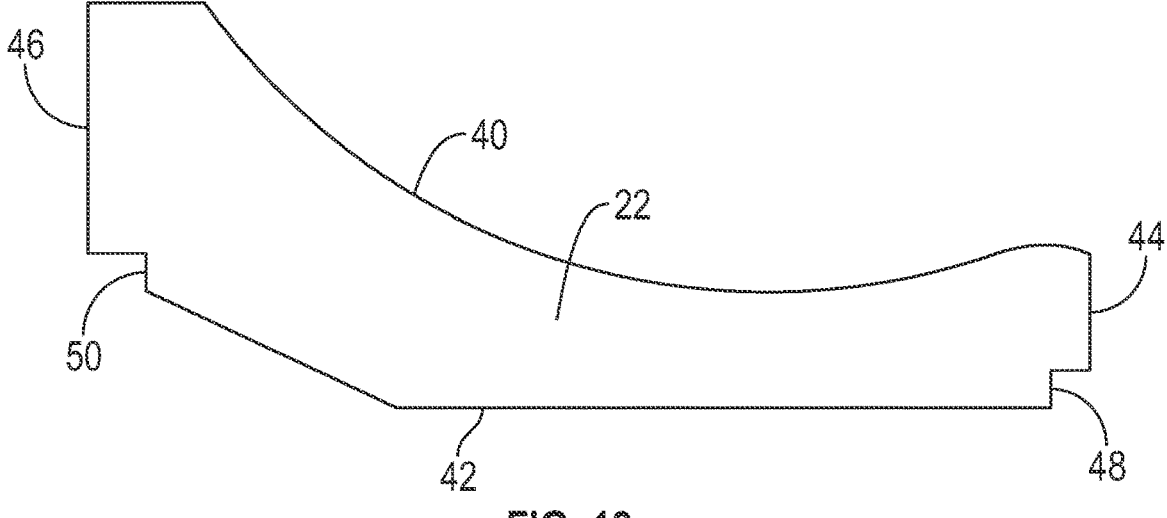
FIG. 18 is a front elevation view of the chine slack shown in FIG. 12.
Figure 19:
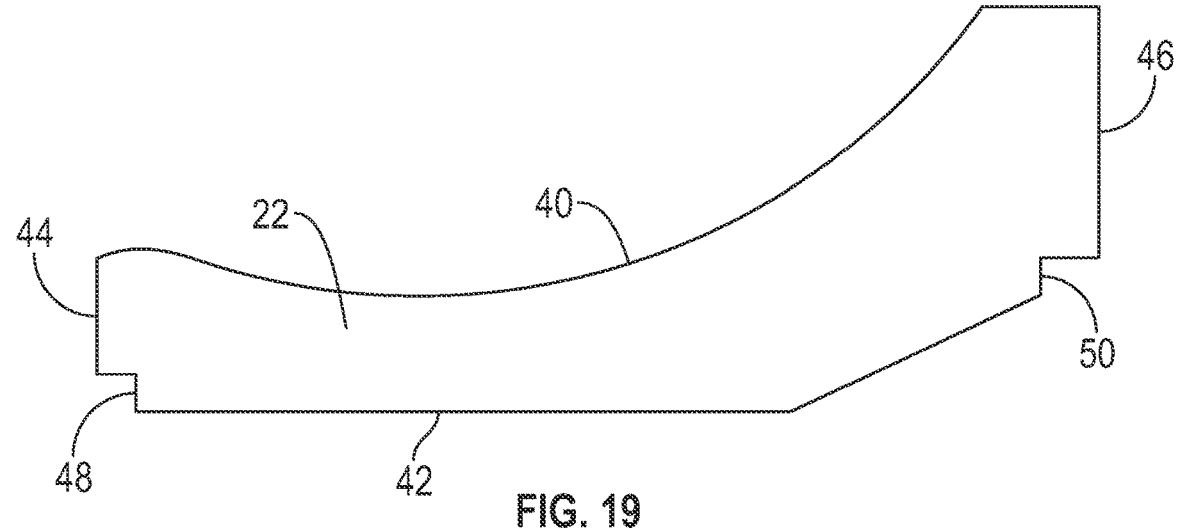
FIG. 19 is a rear elevation view of the chine slack shown in FIG. 12.
Figure 20:
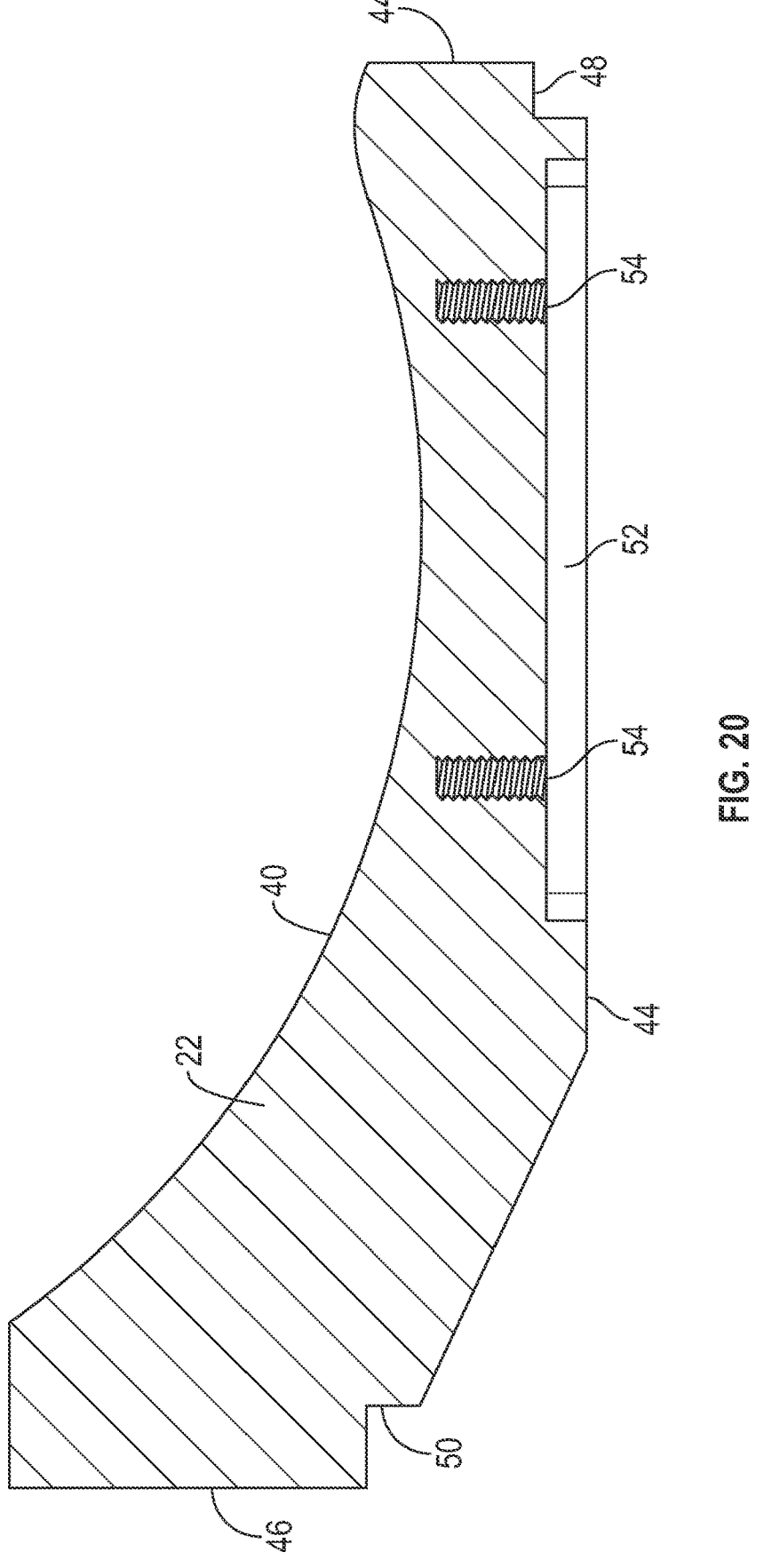
FIG. 20 is a sectional view taken along lines 20-20 in FIG. 12.

Each chine slat 22 includes a curved upper surface 40, a bottom surface 42, and opposite inner and outer ends 44, 46. The ends 44, 46 each have a lower notch 48, 50, as best seen in FIG. 13, which mate with or are supported by the rails 23, 25, as seen in FIG. 5. The bottom 42 of each chine slat 22 includes a recess or pocket 52 for receiving the tabs or flanges 36 on the chain 18C. The chine slats 22 are secured to the chain 18C by bolts 38 received and threaded holes 54 on the bottom of each slat.

Figure 2:
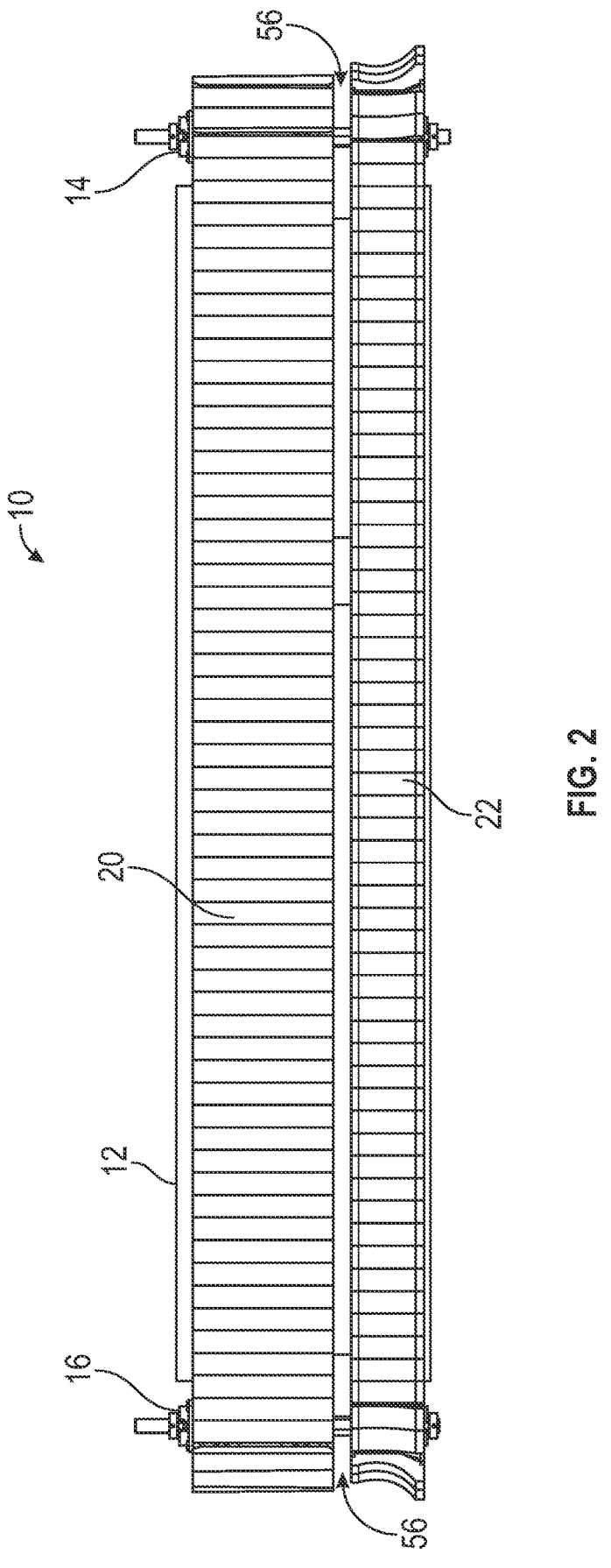
FIG. 2 is a top plan view of the conveyor assembly shown in FIG. 1.
Figures 3, 4:
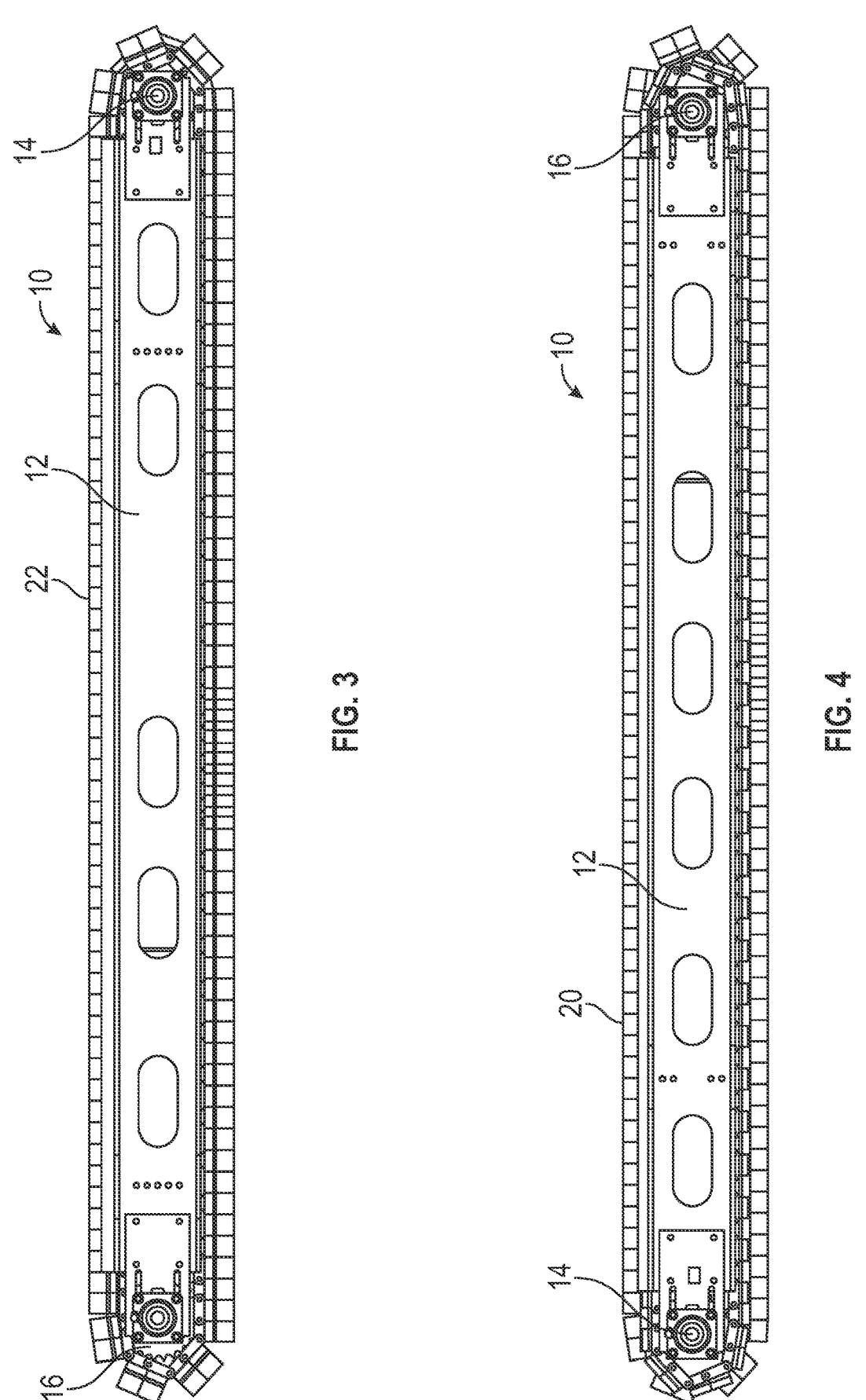
FIG. 3 is a left side elevation view of the conveyor assembly shown in FIG. 1.
FIG. 4 is a right side elevation view of the conveyor assembly shown in FIG. 1.

The inner ends 28 and 44 of each pair of belly and chine slats 20, 22 are spaced slightly apart from one another, as seen in FIG. 2. The gap 56 between the belly slats 20 and the chine slats 22 accommodates the blades of the loin puller machine which extend through the gap, with the upper and lower ends of each blade being attached to the machine above and below the slats 20, 22. The belly slats 20 support the belly portion of the carcass, while the chine slats 22 support the chine portion of the carcass. The upper surface 40 of the chine slats 22 have a curvature which substantially matches the curvature of the chine portion of the carcass. The slats 20 reside side by side, and the slats 22 reside side by side. Each of the slats 20, 22 is elongated so as to have a longitudinal axis which extends transversely to the direction of travel of the conveyor assembly 10. The slats 20, 22 are separately mounted to the chains 18, so as to move around the rollers 14, 16 at each end of the conveyor assembly 10. If one of the slats 20, 22 becomes damaged, the damaged slat can be easily unbolted or unscrewed from the chain and replaced with a new slat.

The belly slats 20 and chine slats 22 are formed of a rigid or stiff material so that the slats do not sag or deflect between their opposite ends under the weight of the carcass, as in conventional belt conveyors. By supporting the carcass without deflection, the conveyor assembly 10 provides more accurate cutting by the blades of the loin puller machine. More accurate cutting increases yield and reduces waste. The upper surfaces of the slats 20, 22 may be smooth or textured, such as a saw tooth or other texture for enhanced gripping of the carcass.

The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

What is claimed is:

1. A loin puller machine having a conveyor for carrying pork carcasses for cutting by blades on the machine, the conveyor comprising:

an endless loop chain assembly mounted on the machine;

a drive system including a drive roller and an idler roller about which the chain assembly is operatively mounted;

a first set of belly slats mounted on the chain assembly to support a belly portion of the carcass; and a second set of chine slats mounted on the chain assembly to support a chine portion of the carcass;

whereby the first and second slats form an endless loop, with the carcass being supported by a portion of the loop.

2. The machine of claim 1 wherein the belly slats have a substantially flat upper surface.

3. The machine of claim 1 wherein the chine slats have a curved upper surface.

4. The machine of claim 1 wherein the belly and chine slats all have flat bottom surfaces with a recess to receive a portion of the chain assembly for mounting the slats onto the chain assembly.

5. The machine of claim 1 wherein the belly slats and chine slats have adjacent edges which are aligned with one another.

6. The machine of claim 1 wherein the chine slats have an inner edge and an outer edge, and the outer edge extends above the inner edge.

7. The machine of claim 1 wherein the belly and chine slats are rigid so as to prevent sagging under the weight of the carcass.

8. The machine of claim 1 wherein the chain assembly has a plurality of links, and each link being mounted to only one of the belly or chine slats.

9. The machine of claim 1 wherein the chain assembly includes first, second and third chains which move in unison, with the belly slats mounted on the first and second chains, and the chine slats mounted on the third chain.

10. A method of conveying a pork carcass for cutting on a loin puller machine, comprising;

supporting a belly portion of the carcass on top of a plurality of first slats having flat upper surfaces;

supporting a chine portion of the carcass on a plurality of second slats having curved upper surfaces;

the pluralities of first and second slats being connected to an endless loop chain assembly; and driving the chain assembly around end rollers to move the pluralities of first and second slats and carcass past cutting blades on the machine, without the slats sagging due to the weight of the carcass.

11. A conveyor for a loin puller machine having blades for cutting a meat carcass, comprising:

a plurality of rigid slats to support the carcass;

the slats including a first set of flat slats to support a belly portion of the carcass and a second set of curved slats to support a chine portion of the carcass; and a chain drive connected to the slats to move the slats in an endless loop and thereby move the carcass for cutting by the blades.

12. The conveyor of claim 11 wherein each pair of the flat slats and the curved slats are positioned end-to-end adjacent to one another.

13. The conveyor of claim 11 wherein the chain drive includes first and second chains to support 12 flat slats and a third chain to support the curved slats.

14. The conveyor of claim 11 wherein the first and second sets of slats are spaced laterally apart and the blades extend between the first and second sets of slats.

15. The conveyor of claim 11 wherein the slats have top and bottom sides, and the chain drive is connected to a bottom side of the slats.

16. The conveyor of claim 11 wherein the slats each have a bottom surface with a recessed portion, and the chain drive is mounted in the recessed portions.

17. The conveyor of claim 11 wherein the carcass moves in a first direction and the slats extend laterally relative to the direction of travel.

18. The conveyor of claim 11 wherein the slats are elongated and are positioned side by side.

* * * * *